Aug. 27, 1929.   A. C. ATWOOD   1,725,843
CRANBERRY PICKING AND VINE TRAINING SCOOP
Filed Jan. 10, 1928
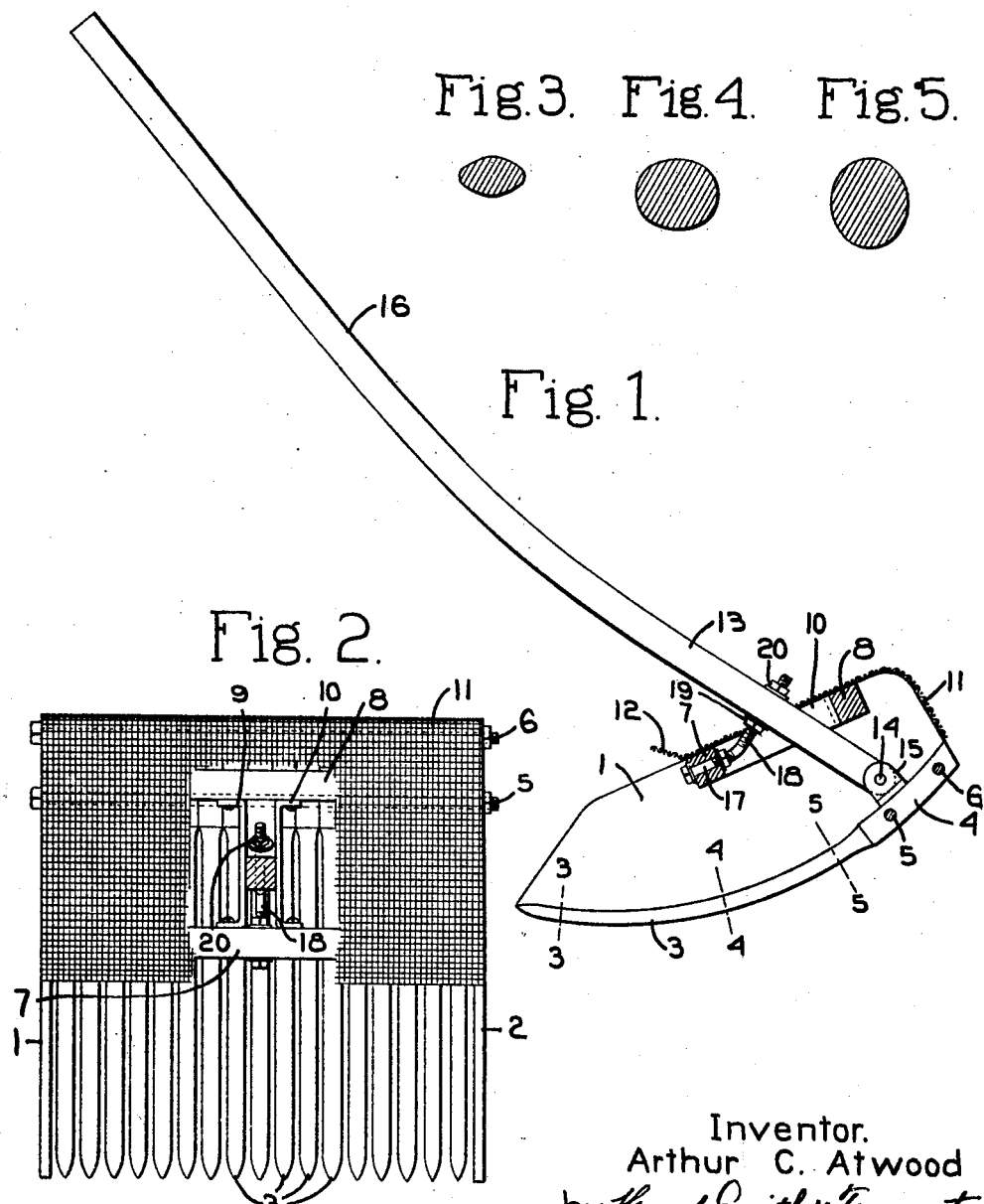
Inventor.
Arthur C. Atwood
by Heard, Smith & Tennant.
Attys Patented Aug. 27, 1929.

1,725,843

UNITED STATES PATENT OFFICE.

ARTHUR C. ATWOOD, OF MIDDLEBORO, MASSACHUSETTS.

CRANBERRY-PICKING AND VINE-TRAINING SCOOP.

Application filed January 10, 1928. Serial No. 245,799.

This invention relates to improvements in cranberry scoops and the principal object thereof is to provide a novel drag scoop having a long handle and so constructed that it can be more efficiently operated to pick the cranberries and will also act at the same time to train the vines.

Usual cranberry scoops comprise a receptacle the bottom of which is provided with forwardly extending parallel fingers which are substantialy straight throughout the entire length, and provided with front and rear handles. In using scoops of this character the operator stands or kneels upon the ground behind the scoop and pushes the scoop forwardly with the fingers resting upon the ground so that the fingers pass beneath the loaded vines. The front end of the scoop is then tilted upwardly and the scoop raised to complete stripping the berries from the vines and to retain them in the scoop. The tilting and raising of the scoop lifts the vines from the ground and often tears the vines and frequently pulls the roots of the plants out of the ground.

The present invention contemplates the production of a drag scoop having a long handle and which can be given a swinging sweep by the operator while standing in substantially erect position and which will strip the cranberries from the vines with a minimum injury to the vine.

A further important object of the invention is to provide a drag scoop of this character which may be employed to train young vines in such a manner that the vines will lie in substantial parallelism, and which when employed on old vines will cause a minimum amount of damage and will also train the vines to lie more nearly in parallelism.

In young cranberry vines the fruit or berries grow at the end of the vines. The succeeding year's growth continues from the ends of these vines, or from fruit-bearing laterals extending from the main vine, and this continues from year to year so that if the vines can be trained during their early growth, in such a manner that the vines will lie in substantial parallelism, picking can be done more easily and the damage done by cranberrying scoops will be reduced.

One of the objects of the present invention is to produce a drag scoop having curved fingers extending forwardly and upwardly from the heel of the scoop, which preferably is narrow, with a handle so arranged that when the scoop is operated with a swinging movement by a standing operator, the fingers will maintain a substantially tangential relation to the ground throughout the effective picking stroke of the scoop, and will then gradually rise through the vines during the continued forward motion of the sweep without exerting any substantially lifting strain upon the vines. When cranberries are thus picked from young vines the action of the scoop straightens the vines and causes them to lie in substantial parallelism and subsequent picking in a like manner continues the training of the vines so that they can be readily picked from year to year without substantial injury. The scoop may be also employed effectively to pick, and at least partially to train, older cranberry vines which have not hitherto been trained in the manner aforesaid.

A further object of the invention is to provide means for adjusting the handle so that relation between the inclination of the handle and the bottom of the scoop may be adjusted so to balance the scoop that the operator can manipulate the scoop conveniently in the manner aforesaid. Such adjustment also enables the device to be adapted to the characteristic requirements of different operators, such as short and tall men.

A further object of the invention is to provide a cranberry drag scoop of the character herein described which will be of a light construction easily manipulated.

These and other objects and features of the invention will more fully appear from the following description and the accompanying drawings and will be particularly pointed out in the claims.

A preferred embodiment of the invention is illustrated in the accompanying drawings, in which, Fig. 1 is a vertical longitudinal sectional view through the scoop and illustrating in elevation the handle and the preferred manner in which it is secured to the scoop;

Fig. 2 is a plan view of the scoop, the handle being shown in section;

Figs. 3, 4, and 5, are cross sectional views of the fingers on lines 3—3, 4—4, and 5—5 respectively of Fig. 1.

A preferred form of drag scoop illustrated in the accompanying drawings comprises a body having flat sides 1 and 2 of wood, presenting curved, preferably arcuate, lower edges and a bottom formed of a series of parallel curved fingers 3 having heel portions 4 of rectangular cross section which are held in juxtaposition by bolts 5 and 6 extending through the assembled heel portions 4 and the sides 1 and 2. The fingers are so constructed that the space between adjacent fingers is substantially uniform. The fingers, however, desirably are of progressively decreasing cross sectional area from the base toward the points thereof. The tapering construction of the fingers is shown more particularly in Figs. 3, 4, and 5, in which Fig. 3 illustrates a cross section of the fingers near the points thereof; Fig. 4 a cross section approximately midway of the length of the fingers; and Fig. 5 a cross section in proximity to the heel portion 4. It will be noted from these figures that the horizontal diameter of the fingers is substantially uniform, while the vertical diameter decreases from the base toward the point of the fingers. By virtue of this construction the strength of the fingers increases progressively from the points to the heel, thus affording sufficient strength with a minimum amount of weight.

The upper portions of the sides 1 and 2 are connected by a frame which as illustrated comprises two parallel cross bars 7 and 8 which are connected at their ends to the sides 1 and 2 in any suitable manner and are spaced apart by parallel brackets 9 and 10 which form guides for the handle as will hereinafter be described.

The rear end of the scoop is closed. In the preferred construction illustrated such closure is provided by a wire screen 11 which extends from the heel upwardly along the rear edges of the sides, then forwardly along the top edges of the sides and over the frame, and desirably projects a short distance therebeyond with the projecting portion 12 thereof bent upwardly to form a baffle which will direct upwardly flying berries into the scoop.

The scoop is provided with a long handle which is so formed and connected to the scoop as to enable the scoop to be dragged through the vines with a swinging stroke by an operator standing in upright or substantially upright position. The handle may be connected to the scoop in any desirable manner and extends in effect upwardly and forwardly from approximately the center of the body of the scoop in such direction that a normal drag sweep of the scoop made by the operator will cause the curved fingers to maintain a substantially tangential relation to the ground, whereby lifting of the vines will be avoided and the pull upon the roots reduced to a minimum.

In the preferred construction illustrated the handle comprises a shank portion 13 which is pivotally mounted at its lower end upon a stud 14 carried by a bracket 15 which is secured to the heel portion 4 of the bottom of the scoop. The shank portion 13 desirably is curved upwardly and forwardly and merges into preferably a straight hand-gripping portion 16, the axis of which is in alinement with, and if extended would intersect, the central portion of the scoop. The handle may be secured to the frame of the scoop in any desired manner. Preferably, however, means are provided for adjusting the angular relation of the handle to the bottom of the scoop for the purpose of balancing the scoop properly to suit the requirements of the operator, or of different operators such as short and tall men.

In the preferred embodiment of the invention illustrated a bolt 17, which passes through the front cross bar 7, and is anchored therein, is provided with an upwardly curved screw threaded portion 18 which passes through the shank portion 13 of the handle and is adjustably secured thereto by nuts and washers 19 and 20 located upon opposite sides of the handle shank. By backing off one of the nuts 19 or 20 and screwing up the other, the angular relation of the handle to the bottom of the scoop may be varied as desired to adapt the device to the characteristic movements of the operator.

In the operation of the device the operator standing at the edge of the cranberry bog, or upon a picked portion of the bog, advances one foot alongside of the area to be picked, then raises the scoop and leaning forwardly introduces the ends of the fingers into the vines. He then makes a sweeping stroke. The relation of the handle and the curved member of the blades of the scoop is such that during this stroke the fingers will maintain a substantially tangential relation to the ground until the points of the fingers pass the position of the other foot beyond which the continued movement of the sweep will gradually raise the ends of the fingers upwardly until the stroke is completed, at which time the entire scoop will have been raised above the vines, and the berries collected in the receptacle formed by the bottom, sides, and closed rear end of the scoop.

For the next sweep the operator will then take another step forward and repeat the same movement, and thus continuing until a strip having the width of the scoop has been picked across the bog. Succeeding strips will be picked in a like manner.

It will be obvious that in thus picking the cranberries the operator will stand upon a picked area and that the sweep of the scoop when properly manipulated will cause the points of the fingers to rise from the ground in the portion of the area which has been picked by the previous sweep and in which the vines have been laid parallel by the preceding sweep of the scoop so that there are no tangled vines to be pulled by the raising of the scoop.

The curvature of the fingers forming the bottom of the scoop will hold the berries within the scoop and will enable the operator to make a plurality of sweeps before emptying the contents of the scoop, if the quantity gathered by a single sweep is insufficient to justify emptying the scoop.

Where young cranberry vines are picked by a drag scoop of the character above described, the picked vines will lie in substantial parallelism and thereby trained for the next year's picking. When picked in subsequent years this training continues so that the bog may be picked much more easily in successive years than those which are not subjected to such training. By the avoidance of tearing and pulling out the vines the bog is retained in a better and more profitable condition than bogs picked by usual hand-scoops.

The manipulation of the scoop by the operator is less tiresome than manipulation of usual types of scoops and a far greater area can be picked per day with a drag scoop than with usual types, as the scoop can be manipulated with a natural easy swinging movement as distinguished from the sliding and lifting movements required to operate usual scoops.

Thus it will be obvious that various advantages are obtained by the present invention relating both to the efficiency of the picking device and to the preservation of the vines.

It will be obvious that the embodiment of the invention particularly disclosed herein is of an illustrative character and is not restrictive, and that various changes in form, construction and arrangement of parts may be made within the spirit and scope of the following claims.

Having thus described the invention, what is claimed as new, and desired to be secured by Letters Patent, is:

1. A cranberry picking and vine training drag scoop having sides, a closed rear end and a bottom comprising a heel portion with upwardly curved fingers extending forwardly therefrom and a long handle extending in effect upwardly and forwardly from approximately the center of the body of said scoop in such direction that the normal drag sweep of the scoop made by the operator will cause said curved fingers to maintain a substantially tangential relation to the ground throughout the effective sweep of said scoop, whereby lifting of the vines and pulling up of the roots thereof will be substantially avoided.

2. A cranberry picking and vine training drag scoop having sides, a closed rear end and a bottom comprising a heel portion and upwardly curved parallel fingers extending forwardly therefrom, a long handle pivotally mounted upon the heel portion of the scoop extending, in effect upwardly and forwardly from approximately the center of the body thereof, and means for adjusting the inclination of the handle relatively to said bottom to establish a relation therebetween which will enable the operator to maintain the fingers in substantially tangential relation to the ground throughout the effective picking sweep of the scoop and whereby the scoop may be adapted to the characteristic requirements of different operators.

3. A cranberry picking and vine training drag scoop having sides, a closed rear end and a bottom comprising an arcuate heel portion having forwardly extending curved fingers forming an extension thereof, a long handle having a curved shank pivotally connected at its lower end to said heel portion centrally thereof and a straight hand-gripping portion the axis of which is inclined relatively to the central portion of the bottom of the scoop and means for adjusting the inclination of said handle relatively to the bottom of the scoop.

4. A cranberry picking and vine training drag scoop having a body comprising sides, a bottom having a heel portion and upwardly curved fingers extending forwardly therefrom, and a closed rear end, a frame connecting the upper central portion of said sides, and a handle having a curved shank connected at its lower end to said heel portion and to said frame and merging into a straight hand-gripping portion the axis of which is inclined relatively to the central portion of the scoop.

5. A cranberry picking and vine training drag scoop having a body comprising sides, a bottom having a heel portion with upwardly curved fingers extending forwardly therefrom, a closed rear end and a frame connecting the upper central portion of the sides comprising cross bars with handle-guiding members therebetween extending longitudinally of the central portion of the scoop, a long handle pivotally connected at its lower end to said bottom extending between said guides, and means for securing the handle to said frame in adjusted positions.

6. A cranberry picking and vine training drag scoop having a body comprising sides, a bottom having a heel portion with upwardly curved fingers extending forwardly therefrom, a closed rear end and a frame connecting the upper central portion of the sides comprising cross bars with handle-guiding members therebetween extending longitudinally of the central portion of the scoop, a long handle pivotally connected to said heel having a forwardly and upwardly curved shank extending between said guides and merging into a straight hand-gripping portion and a bolt located intermediate of said guides adjustably connecting said handle to said frame, whereby the inclination of the handle relatively to the bottom of the scoop may be adjusted.

In testimony whereof, I have signed my name to this specification.

ARTHUR C. ATWOOD.